United States Patent
Ravikanth et al.

(10) Patent No.: US 6,785,436 B2
(45) Date of Patent: Aug. 31, 2004

(54) METHOD OF AND OPERATING ARCHITECTURAL ENHANCEMENT FOR COMBINING OPTICAL (PHOTONIC) AND DATA PACKET-BASED ELECTRICAL SWITCH FABRIC NETWORKS WITH A COMMON SOFTWARE CONTROL PLANE WHILE PROVIDING INCREASED UTILIZATION OF SUCH COMBINED NETWORKS

(75) Inventors: Rayadurgam Ravikanth, Acton, MA (US); Kenneth J. Schroder, Waltham, MA (US); Mukesh Chatter, Hopkinton, MA (US); Peter Marconi, Hopkinton, MA (US); Jeffrey Parker, Newton, MA (US); Dimitry Haskin, Andover, MA (US); Zbigniew Opalka, Harvard, MA (US)

(73) Assignee: Axiowave Networks, Inc., Marlborough, MA (US)

( * ) Notice: Subject to any disclaimer, the term of this patent is extended or adjusted under 35 U.S.C. 154(b) by 391 days.

(21) Appl. No.: 10/034,020

(22) Filed: Dec. 28, 2001

(65) Prior Publication Data

US 2003/0128911 A1 Jul. 10, 2003

(51) Int. Cl.⁷ .............................. G02B 6/25; H04J 14/00
(52) U.S. Cl. ............................ 385/16; 385/17; 398/45; 398/58; 398/79; 709/223
(58) Field of Search ...................... 385/16–20, 89–94; 359/237, 238; 398/45, 46, 58, 79, 82; 709/223, 224

(56) References Cited

U.S. PATENT DOCUMENTS 6,606,427 B1 * 8/2003 Graves et al. ................. 385/17
6,647,208 B1 * 11/2003 Kirby ........................... 398/45
2001/0053015 A1 * 12/2001 Thomas ....................... 359/237

* cited by examiner

*Primary Examiner*—Hemang Sanghavi
(74) *Attorney, Agent, or Firm*—Rines and Rines

(57) ABSTRACT

A method of and operating architectural enhancement for combining photonic and data packet-based networks to be unified or integrated as a single device and with a common software control plane, enabling increased utilization of such combined networks and in particular of optical path data flow capacity.

30 Claims, 6 Drawing Sheets

METHOD OF AND OPERATING ARCHITECTURAL ENHANCEMENT FOR COMBINING OPTICAL (PHOTONIC) AND DATA PACKET-BASED ELECTRICAL SWITCH FABRIC NETWORKS WITH A COMMON SOFTWARE CONTROL PLANE WHILE PROVIDING INCREASED UTILIZATION OF SUCH COMBINED NETWORKS

FIELD

The present invention relates to the combined utilization of optical photonic data network switch fabrics (OSF)$_7$ and data packet-based electrical switch fabric networks (ESF) being more particularly concerned with eliminating some of the operational inefficiencies in current data networks wherein multiple and separate control mechanisms and protocols are used for operating ESF and OSF nodes—the invention combining packet-based and photonic networks by providing a hardware architecture with appropriate software algorithms that transform current ESF and OSF network designs and operation from multiple control layers to a one-layer common software control plane that can be represented as an integrated node solution. This novel solution also enables financial benefits through more efficient use of optical path capability for network operators through the use of this invention.

BACKGROUND

Present-day electrical data networks are divided into layers composed of homogenous devices, such as ATM switches for ATM networks, Frame Relay switches for Frame Relay networks, and various other electrical data packet switching technology; and separate photonic or optical crossconnects are also used for optical light-only networks. These OSF and ESF networks operate independently, and are managed independently.

Current operation employs shortest path first (SPF) algorithms to determine best ways to send data traffic through a network. SPF algorithms are also referred to as Dijkstra algorithms. For the purpose of computation, the data networks are composed of computer nodes and interface links such as a fiberoptic link that connects computer nodes to one another directly, or it may be a fiber optic link that connects to a photonic network. The photonic network (OSF), however, is currently completely transparent to or unaware of the control algorithms (i.e. SPF) of the electrical data network (ESF).

Fundamental to the algorithms of the electrical data network, however, is the notion of "link." The purpose of SPF control algorithms is to minimize cost; for example, the number of hops or links that data must traverse from ingress node to egress node. Metrics other than hops may also be used. Link information, however, is indeed the essence of information that is transmitted as control information between nodes in a computer network. SPF algorithms (OSPF, ISIS, PNNI, etc) all operate in a similar manner even though details vary. SPF algorithms were first implemented on the ARPANET in the late 1970's as described, for example, in McQuillan, et. al. "The New Routing Algorithm for the Arpanet," IEEE Transactions on Communications, May 1980. The basic function of these algorithms is to distribute on a hop-by-hop manner a summarization of the status of each link that a device contains. The total collection of all the summarizations from each node in the network is collected in a "Link State Database." The SPF algorithm is run on this database, resulting in minimum distance information from the node doing the calculation, to every other node on the network. In fact, each node in the network does this calculation.

More recently, the concept of type/length/value (TLV) was introduced into the standards, such as OSPF-TE to enhance the capability of SPF-type algorithms, as described, for example, in IETF-draft-ietf-ccamp-ospf-gmpls-extensions-00.txt, OSPF Extensions in Support of Generalized MPLS, work in progress, September 2001. TLVs are appended to standard messages in these protocols to convey information that may be pertinent for some enhanced capability of the network such as Traffic Engineering. These TLVs, for example, may carry information containing maximum and actually used bandwidth on a link. With this information, the SPF algorithms may be modified as necessary to take bandwidth as well as other conventional costs into consideration, including distance, when making a traffic forwarding decision. The underlying SPF infrastructure is not changed, but it is enhanced.

Like any algorithm, there are certain key behavioral concepts that exemplify the working of SPF algorithms. For example, traffic would not enter and exit from the same node and link combination. This would produce non-optimal behavior in so far as SPF is concerned.

The majority of these procedures are defined, or are in the process of being defined, in the Internet Engineering Task Force (IETF), as above referenced, a standards body dedicated to the Internet protocols. Some of the current efforts are works in progress such as IETF-draft-katz-yeung-ospf-traffic-01.txt, Traffic Engineering Extensions to OSPF, work in progress, October 1999, IETF-draft, draft-ietf-mpls-rsvp-lsp-tunnel-05.txt, RSVP-TE: Extensions to RSVP for LSP Tunnels, work in progress, February 2000, and the above citation of September 2001.

Where such electrical data communication networks are used together with optical photonic light communication network links, for example, each type of network—electrical and optical—has its own and separate and homogeneous common control protocol and layers, as before mentioned. When the boundaries between ESF and OSF come together, however, still a third set or layer of common protocols is currently required.

The underlying intention of the present invention, on the other hand, is no longer to treat the ESF and OSF as separate devices but, rather, as one integrated node, and with current control algorithms modified so that such node appears to operate as one device, not as two separate independent devices—integrating OSF and ESF switching capacities so that they are managed as a single "box" or device.

OBJECTS OF INVENTION

A primary object of the invention, accordingly, is to provide a new and improved method of and system-operating architectural enhancement for combining optical (photonic) and data (packet-based) devices as single, integrated nodes using a common software control plane or layer, and thus obviating the multiple layer separate control limitations before described.

A further object is to provide such a novel technique whereby increased utilization of data flow can be provided along an under-utilized, but, available, data flow capability of an optical path, by determining such under-utilization and inserting supplemental data into such path.

Still an additional object is to provide such supplemental data in this under-utilized optical path from either electrical datapackets from an electrical switch fabric or from a further optical path in the optical switch fabric.

Other and further objects will be explained hereinafter and are more fully delineated in the appended claims.

SUMMARY OF INVENTION

In summary, however, from one of its more generic aspects, the invention embraces in a combined optical data-electrical data switch fabric system, a method of more fully utilizing the available data flow capacity of optical paths through the optical switch fabric, that comprises, flowing photonic data packets along a predetermined optical path in the optical switch fabric; flowing other data packets along a separate data flow path; determining when the predetermined optical path is under-utilized in its available data flow capability and the desirability of inserting in that predetermined optical path additional data from the separate data flow path; diverting the photonic data packet flow along said predetermined path into the electrical switch fabric and converting the same into electrical data packets; joining the converted electrical data packets with said other data packets also presented in electrical data packet form; converting the joined electrical data packets into photonic data packet flow; and sending the converted joined photonic data packets along said predetermined optical path of the optical switch fabric.

More specifically, the invention combines an electrical switch fabric (ESF) capability and an optical switch fabric (OSF) capability connected by various hardware elements that are referred to as bridge cards, all managed by a single piece of software referred to as the common control plane. The algorithms that are used to represent the device in the network, however, do not represent the bridge cards as "links" in the network, but rather they are used as "conversion elements." This allows the device to be viewed as a single entity in the network rather than as two distinct elements. By so combining the two different switching elements in a single device allows cost savings and the use of a single control computer for both elements that simplifies the control algorithms that are necessary to manage both the optical and electrical elements.

In the prior art, traffic in an all-optical environment of an OSF would flow from optical port to optical port without inspections of the contents of the traffic. This is called the before-mentioned photonic switching. Similarly, with ESF nodes, traffic would flow from electrical port to electrical port, though this traffic is inspected. Furthermore, traffic could enter the photonic network from an electrical port by use of a conversion element and vice versa. These traffic flows are fairly standard applications even with the present invention.

The invention, however, provides new and important other traffic patterns. When an optical flow is terminated at the ESF via one of the conversion elements, instead of going out an electrical port, the traffic may now be aggregated with other electrical traffic from the electrical port and sent back into the optical network to use available data flow capability of the optical path (s). This not only increases the utilization of the network, but it decreases operational costs and improves manageability as is discussed in greater detail hereinafter.

Preferred and best mode embodiments are also explained.

DRAWINGS

The invention will now be described in connection with the accompanying drawings, FIG. 1 of which is a schematic block and circuit diagram of an electrical data packet switch (ESF) and optical or photonic switch (OSF) interfacing by today's technology;

Figure 6:
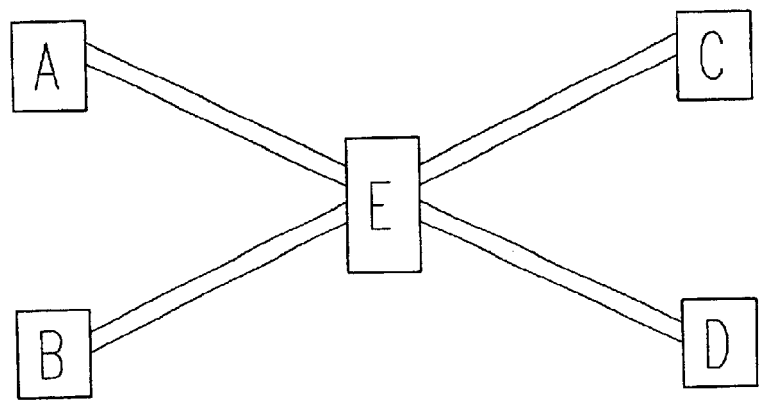
Figure 7:
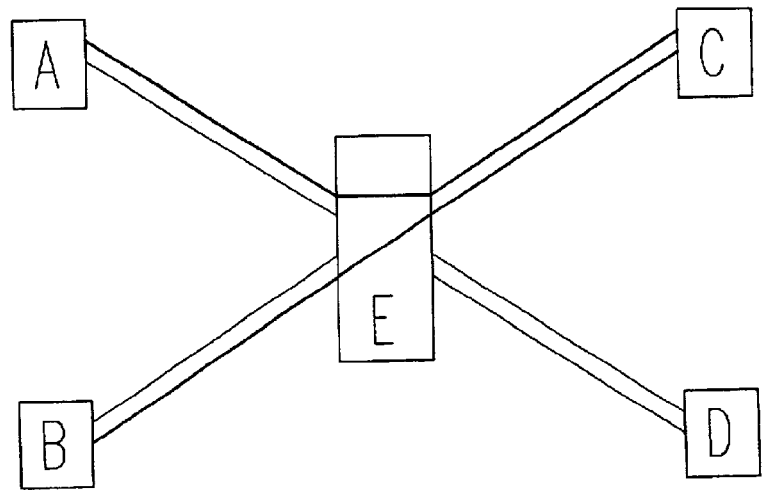
Figure 8:
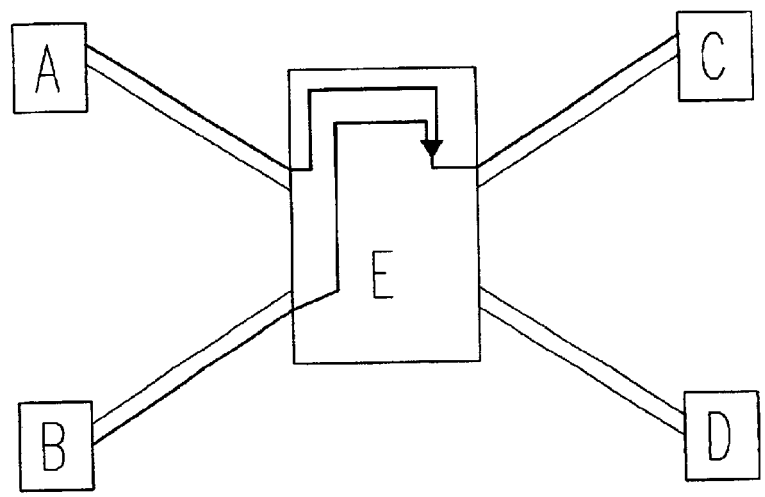
Figure 9:
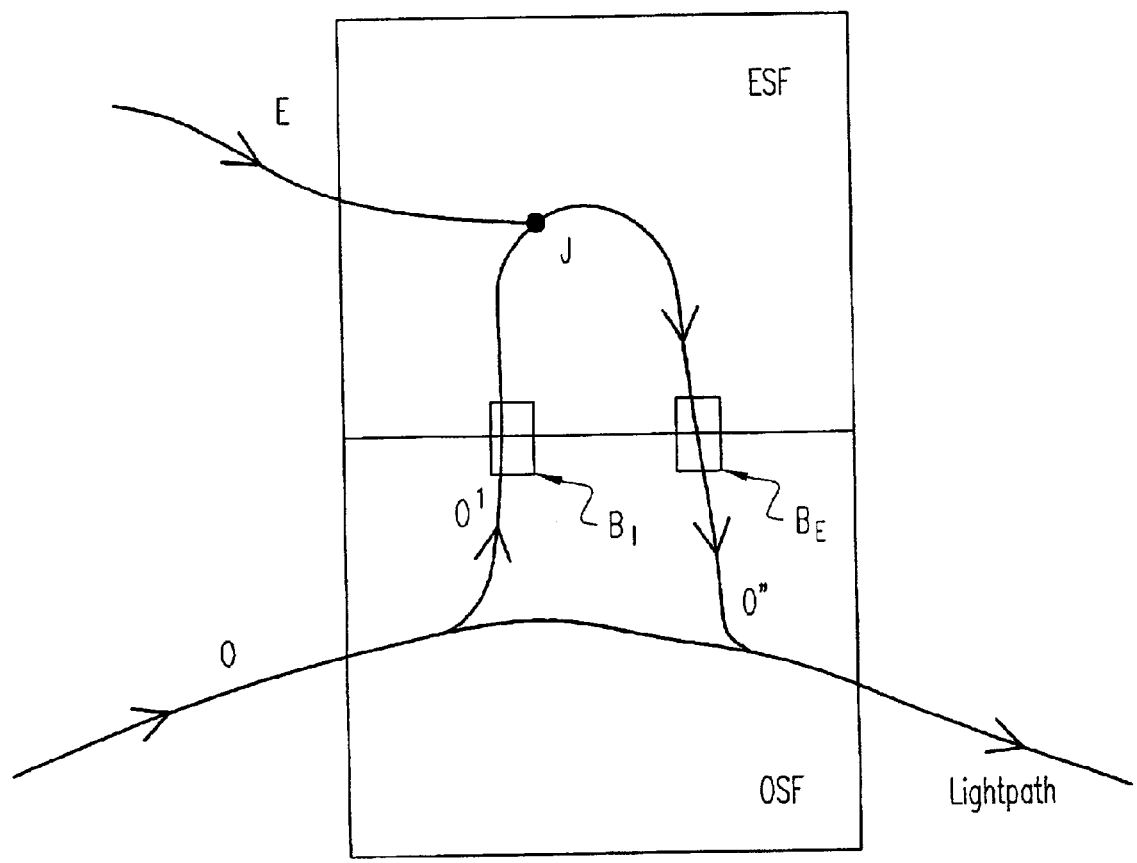
Figure 10:
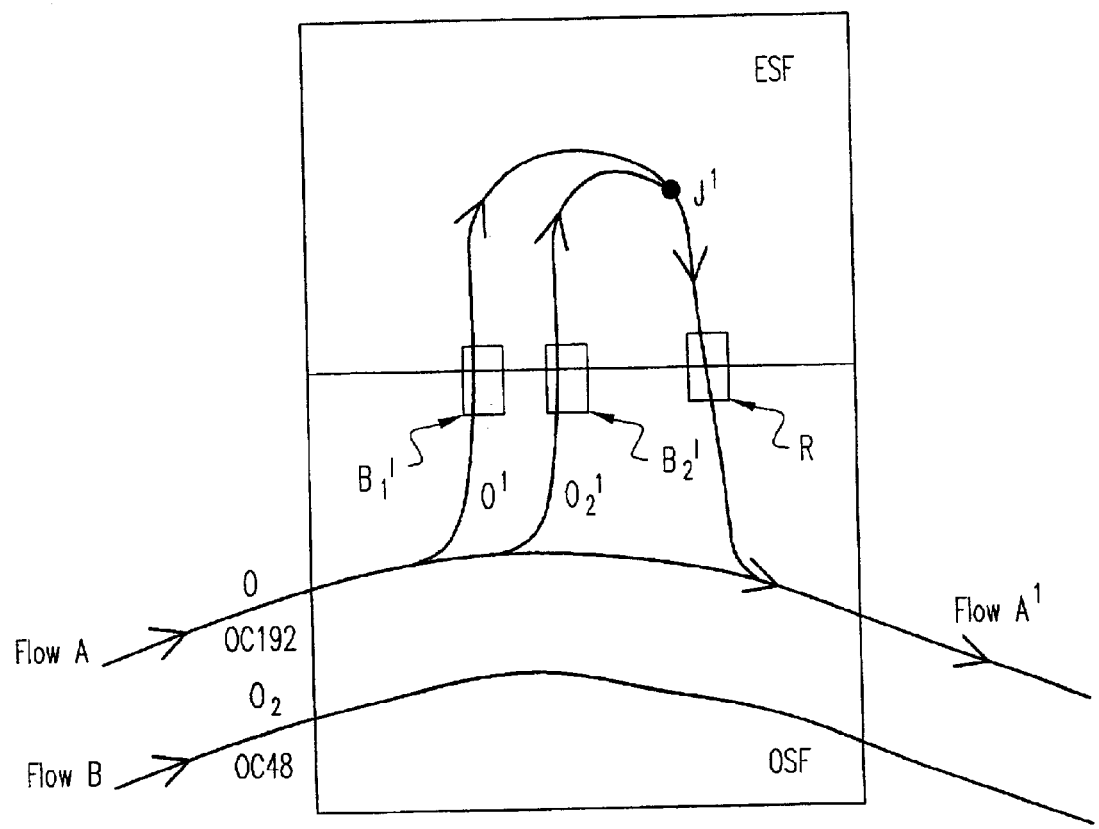

FIGS. 5A and B are further flow diagrams respectively illustrating today's conventional hybrid ESF-OSF switching (A), and the novel passing of data transmissions between ESF and OSF switching afforded by the methodology of the invention (B);

FIG. 6 illustrates the limitations in the current operation of optical configurations, while FIG. 7 shows the combining of the ESF-OSF networks through the conversion element technique of the invention, and FIG. 8, the resulting efficiency in, for example, requiring one less wavelength in setting up the same set of interconnections;

FIG. 9 illustrates the supplementing of under-utilized data flow capacity in an optical path through the OSF by adding ESF packet data converted into photonic data in such path in accordance with the technique of the invention; and FIG. 10 is a similar diagram wherein supplemental photonic data from another optical path through the OSF is added by use of the conversion capability in the ESF, again in accordance with the methodology of the invention.

DESCRIPTION OF PREFERRED EMBODIMENTS OF INVENTION

Before proceeding to describe an illustrative embodiment of the invention, and in order further to contrast the same from current and prior uses of ESF and OSF devices in combination for communications purposes, a brief review is believed helpful.

As earlier described, simply combining electrical and optical switch fabrics will not produce a common node. Electrical and optical switches have similar architectures except that the nature of I/O cards and the switch fabrics are different. A control processor exists for the management of the entire system. An ESF is responsible for moving data packets from one I/O card to another I/O card. I/O cards are also responsible for converting optical signals to electrical signals and then processing the contents of the data. The packet links are optical links that connect one switching node to another switching node. In the case of an optical switch, the I/O cards may be purely optical and move light from one port to another; or they may convert light into electrical signals for performance measurement and error handling capability, both of which can not be done in a purely optical domain.

Figure 1:
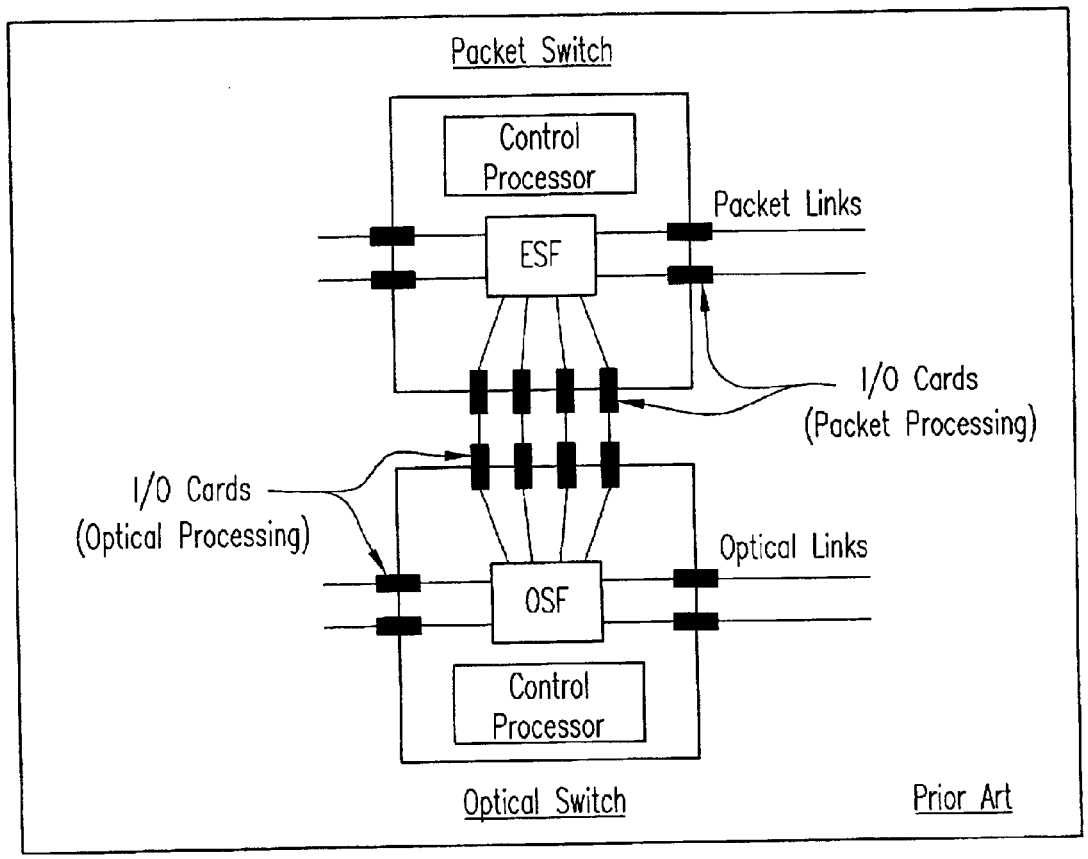

In current practice, when the ESF and OSF system nodes are connected together for the purpose of communications, the general configuration of FIG. 1 is created. In the case of such dual node configurations, optical links are the common method of interconnection between the two systems. Each system has its own I/O cards with different capabilities and each has its own control processor for system management. External links either using one of the optical fibers or an external Ethernet (not shown) must be used for control processor communication. This type of communication, however, is subject to a wide variety of system complexities. First, protocols must be invented to allow reliable communication, and then software updates at one processor must be sufficiently tested with regard to the protocol with the other switch, producing additional burden on network cost and operations.

With the unified or integrated architecture of this invention, however, the common element that binds optical and electrical capabilities OSF and ESF is no longer an optical link. Rather, it is the bridge card (or logically a conversion element) as shown at B in FIG. 2. The bridge cards are capable of direct interface with both of the fabric types. Only one control processor CP is required, as later more fully discussed, capable of managing both entities in a standard fashion. Since bridge cards are based on electrical processing—the conventional "packet processing" of FIG. 2—they have standard electrical interface characteristics. This means that bridge cards can be OC48 SONET/SDH, OC192 SONET/SDH, Gigabitethernet, etc. The type of cards defines part of the logical aspect defined herein as a "conversion element" that is transmitted in a TLV, before described.

Figure 2:
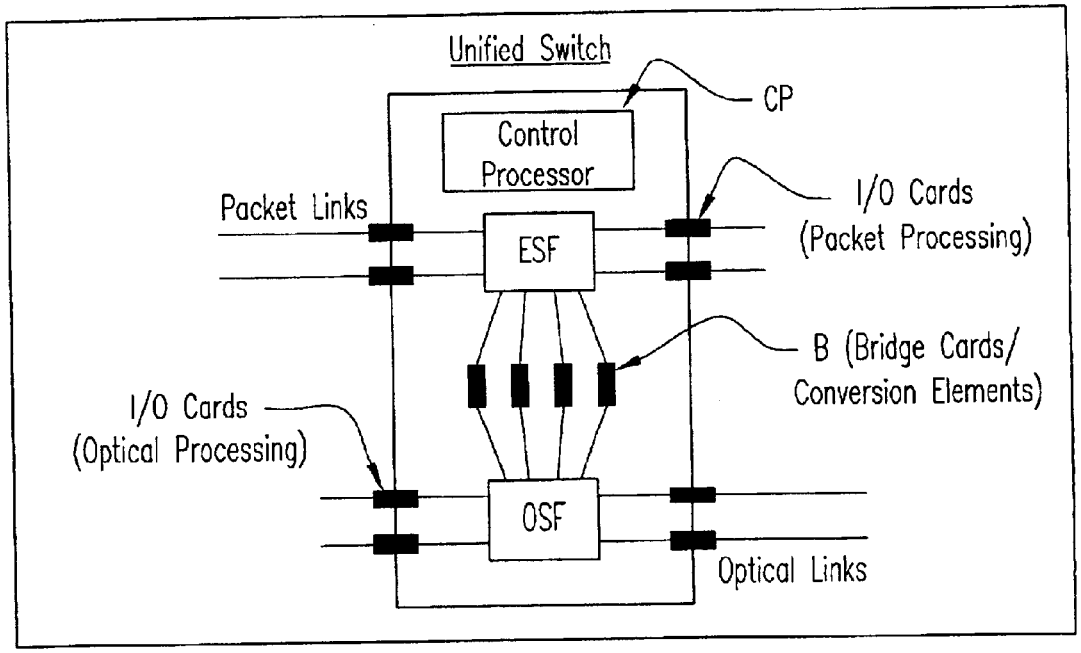
FIG. 2 is a similar diagram but incorporating the novel node integration of the ESF and OSF of the invention.

It is believed to be useful, before going further in the disclosure of the preferred or best mode implementations of the present invention, to review in somewhat more detail, the current separate controls of and communication techniques between packet switches (ESF) and optical switches (OSF) of FIG. 1, and then to contrast this with the overall unified or integrated switch device technology of the present invention, as schematically illustrated in FIG. 2.

Conventional Packet and Optical Switch Operation and Their Current Dual Node Interconnection While current packet networks such as those based on Multiprotocol Label Switching (MPLS) and Asynchronous Transfer Mode (ATM) can operate over optical transport networks, they operate as two totally different and independent networks; namely, a circuit switched optical network OSF and a packet switched network (ESF). The respective networks are built using homogenous devices. The ATM networks, for example, are built using ATM switches, etc. Whenever such two heterogeneous network devices are connected together, the link between them is treated as an external connecting mechanism and is so represented in current topology discovering algorithms. These dual networks, moreover, imply two different management planes and hence represent substantial complexity.

The optical network only provides optical light path connectivity and is not aware of what kind of traffic is carried in its light paths.

The packet network, on the other hand, is a network of packet switches, wherein the switches assume connectivity to other packet switches and do not care about and are not aware of what kind of connectivity there may be (optical or otherwise). As a result of the above, the optical network is laid out based on aggregate demands of the packet traffic. But each optical node is only capable of light flow and hence cannot perform any packing of the wavelengths.

Consider, for example, the configuration shown in FIG. 6. Nodes A, B, C and D are all shown connected to E through two wavelengths each, considered to be bi-directional links. Let the capacity of each wavelength, in each direction, be 1 unit. Assuming as an illustration that there is a demand of 0.5 unit of packet traffic from A to C and 0.5 from B to C, if E were a conventional optical node, as is currently available in the market, it could only switch an incoming wavelength to an outgoing wavelength, and it is agnostic as to what is being transported over that wavelength. Thus A and C will be connected using one wavelength and B and C will be connected with one wavelength, producing the resulting configuration shown in FIG. 7. Both wavelengths going from E to C will be used up. This, however, is inefficient because two wavelengths are used up for only one unit of total traffic between E and C. Thus, if a new request for a bandwidth of 0.5 unit between D and E is made, this connection will be rejected because there are no available wavelengths between E and C.

Figure 4:
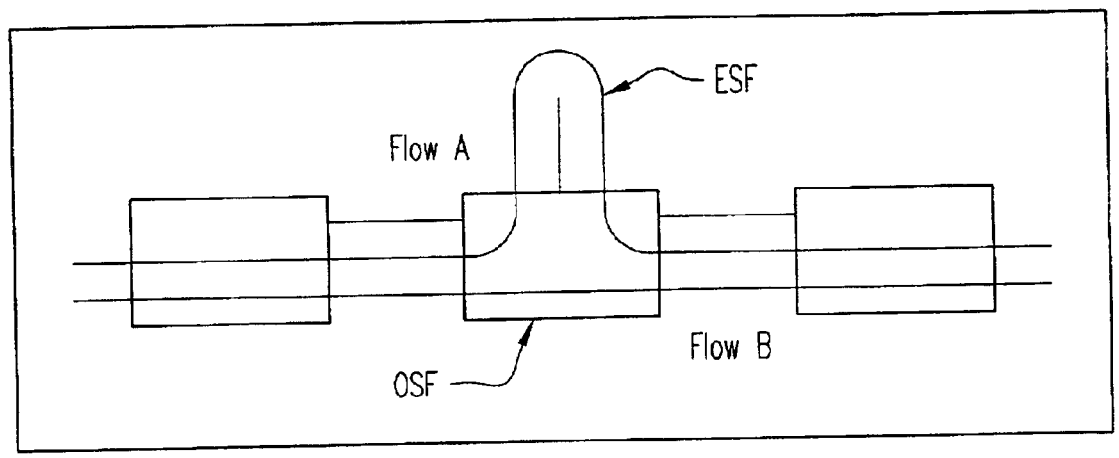
FIG. 4 is an explanatory flow diagram of shortest path flow.

Furthermore, by combining devices of two different types (ESF and OSF) is not sufficient actually to produce a common node as used by standard networking algorithms. While a box containing two capabilities (electrical and optical) can be "bolted" together as shown in FIG. 1, the current algorithms deployed in such networks today would not be able to treat this type of device as a single unified or integrated node, and thus the aforementioned efficiencies could not be garnered. The example earlier described and more fully later discussed, particularly in connection with the embodiment of FIG. 9, whereby data traffic is sent to the ESF and then back out to the OSF, (as schematically shown in the FIG. 4 as Flow A, would not be allowed in SPF since the shortest path would be Flow B. The top node thus would be extraneous.

Figure 5:
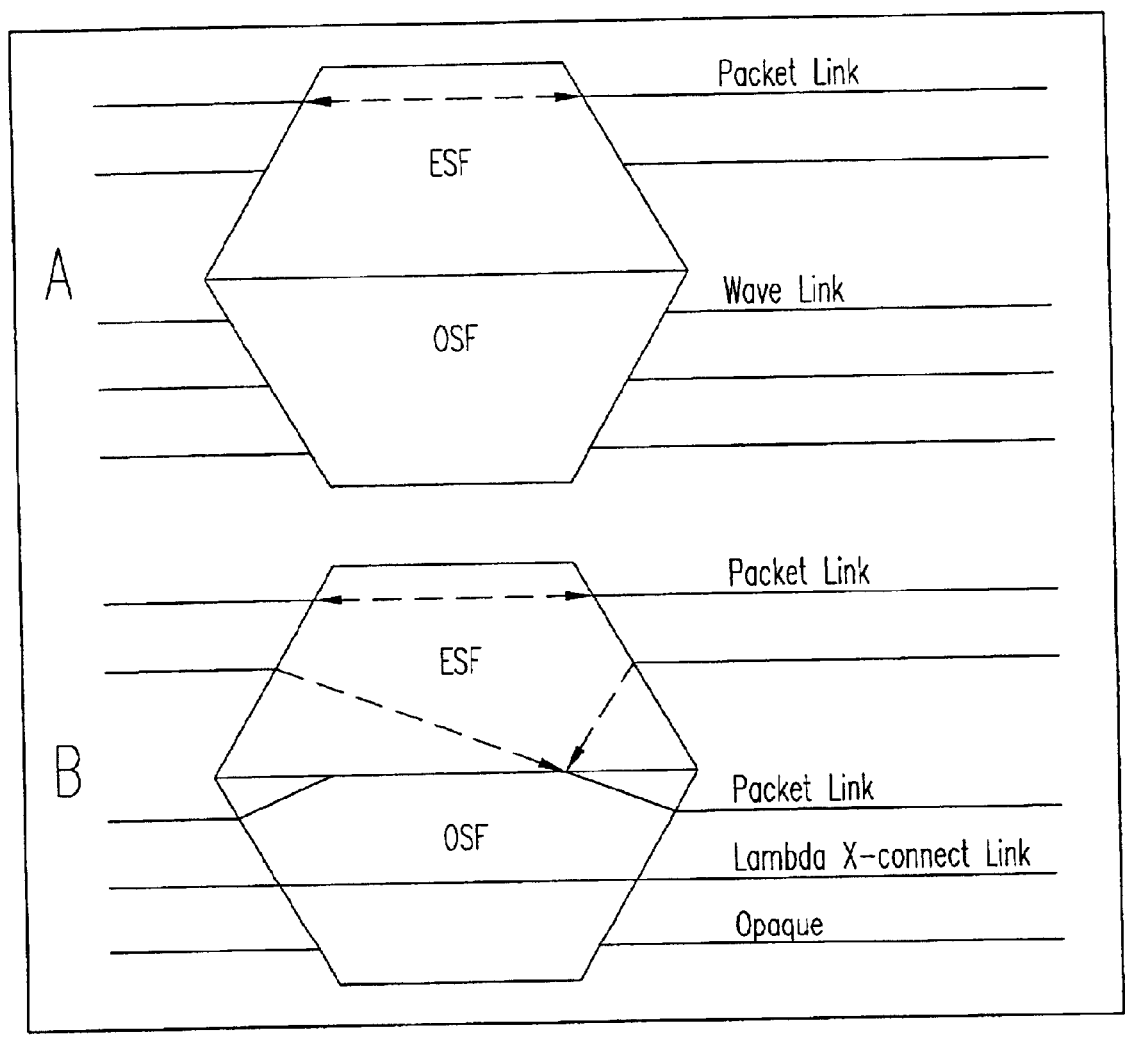

Diagram A of FIG. 5 shows a hybrid switch consisting of electrical (ESF) and optical (OSF) switch fabrics with respective packet-capable and wavelength-capable interfaces. In these respective conventional homogeneous devices, electrical crossconnect can switch packets between its packet-capable interfaces, as is well known, and optical crossconnect can switch wavelength between its wavelength capable interfaces as is also well known—all in a single hybrid device.

In the typical conventional environment of Diagram A, packets come in packet links and are transmitted on other packet links. In the OSF case, light comes in on one port and is transmitted to another port. Since, in a conventional solution, these would be separate boxes, links would be provided between the ESF and OSF boxes. The ESF would view the link as a packet link in its SPF capability, while the OSF would view the link as an optical link. In the conventional case, the OSF would never see any of its connections as packet connections, nor would the ESF see its links as anything other than packet links.

Thus, a new method in the control algorithms must be introduced that does not break the rules of SPF but, when under-utilization of the optical data flow path is determined, allows the optical traffic to be diverted from the optical domain into the electrical domain, there converted to the electrical domain and also combined or joined with more data traffic in the electrical domain, and then converted to photonic data and inserted back into the optical domain to supplement the optical flow, thus better to utilize its capability. These extensions to current algorithms represent the methodology and software part of the present invention as will now be described.

This under-utilization of the network capability, moreover, is currently unknown in that the optical network has no knowledge of the packet network demands or of its own under-utilized data flow.

The Unified or Integrated ESF-OSF Node of the Present Invention

Comparing and contrasting this conventional current hybrid linking of ESF-OSF nodes, earlier described with reference to Diagram A of FIG. 5, with the unified or integrated node concept of the invention, attention is directed to the media conversion element technique schematically shown in Diagram B of FIG. 5 which enables this passing of data transmissions between the two different electrical and optical types of data switch fabrics.

In essence, an optical wavelength-capable interface can be connected to an ESF through such a conversion element and as such, for all practical purposes, can become a packet-capable interface. As a result, in accordance with the invention, a wavelength-capable interface can be connected or disconnected to or from ESF by simply controlling switching elements of the optical switch fabric and without requiring hardware upgrades or physical reconfiguration. Such a capability provides an unprecedented flexibility to change logical topology of the underlying network for rapid adaptation to changing traffic demands and subsequently better utilization of available optical path resources.

From the perspective of SPF algorithms, optical links that terminate in a conversion element are thus able to be used as forwarding links to the electrical part, and similarly electrical links can now forward traffic to conversion elements and thus to the optical links. Optical links that do not terminate in conversion elements are still strictly capable of carrying lightpaths and are so treated in SPF computations.

The current invention therefore deals with combining the two networks through the use of such "conversion elements" that allow a link to be converted from an "optical link" to an "electrical link" and vice versa.

The present invention, accordingly, through the use of such "conversion elements," and appropriate algorithms, creates a hybrid node that can process both packets and optical connections. The use of such conversion elements allows the optical network to be better optimized for the needs of the packet traffic and not under-utilized.

The conversion element of the invention, therefore, is a mechanism that connects different parts of a given node (such as the electrical and optical switching fabric) and allows data to be converted from one domain to the other. An example of such conversion is the taking in of electrical data packets at one end and the outputting of light at the other, and vice-versa. Other similar conversion functions can be visualized as well. For instance, wavelength converters present in a node are another type of conversion element.

The conversion element, moreover, contains the intelligence to route the packet traffic. For instance, the conversion element can take data encoded in a wavelength, and output a packet in the electrical domain; and with the routing intelligence embedded in it, it can also determine where the packet is to be sent next.

The capabilities provided by the conversion elements, moreover, are node internal, and currently cannot be known to other nodes in the network. In accordance with the present invention, to the contrary, a new TLV type message is provided, later detailed, that will allow a node to advertise or disseminate information about its conversion elements to other nodes.

The capabilities provided by the conversion elements in conjunction with the standard packet and optical interfaces are stored in a common database referred to as the Bandwidth Engineering Database, which is thus also aware of the packet links and the optical links.

The use of routing algorithms for learning packet and optical network topology, moreover, enables better optimization of network usage. With the conversion element providing the physical device that enables this optimization, packet switches do not have to be collocated with every optical node.

These proposed extensions to the routing protocols provided by the invention, furthermore, allow the optical node to know what kind of traffic is being transported over the optical connections. They can, however, still only switch wavelengths. The key benefit of the current invention is the creation of a hybrid node, wherein the conversion element allows packet-processing capability to be present on the same network element as the optical cross-connect, thereby allowing the network element to process traffic at the packet level or as a wavelength. This choice can be made depending on what makes sense from the point of view of packing of the wavelengths.

In the example earlier described in connection with FIG. 7, as an illustration, the node E is provided with such packet-processing capability and also has conversion elements. Instead of wasting two wavelengths between E and C, the two incoming wavelengths could be terminated at the packet-processing module shown in FIG. 8 and then sent to C on a single wavelength.

Thus, one less wavelength is used in setting up the same set of connections.

Routing algorithms are today used to allow advertising of node-to-node connections or links. The present invention further introduces the concept of advertising node internal attributes, such as "conversion capacity," thus allowing for better optimization of the network. The new TLV of the invention, later detailed, allows a node to advertise its internal attributes to the rest of the nodes in the network, for example, enabling the determining of under-utilization of optical paths.

The use of the conversion elements of the invention additionally enables the node to be configured differently, as per customer needs. The same box can be configured, for example, as a node with N electrical links, M optical links and C conversion elements as well as a node with N+C electrical links and M–C optical links.

If the node has only external optical links, as a further illustration, the use of the conversion elements and the electrical switch fabric renders the optical node "intelligent." If, for example, the nodes in the network are aware that a particular connection is a packet connection, they can use the conversion elements at the optical node to pack the wavelengths better. Thus, the use of conversion elements, in addition to providing the unifying feature of a common control plane, provides intelligence to the optical node and allows it to adapt its configuration better to suit the needs of the packet traffic that it carries. Absent this feature of the invention, an optical node cannot be sensitive to packet traffic demands except at the granularity of the wavelengths.

How this information is transmitted in a network is illustratively illustrated in the following example of a novel TLV using OSPF-TE protocol as the basis for the topology dissemination protocol. The shaded part is the generic part of the protocol, while the remaining area describes the TLV representation of the conversion elements of the invention.

| | |
|---|---|
| Version# = 2 | Type = 4 | Packet Length = 148 |
| Switch ID | |
| Area ID | |
| Checksum | AuType |
| Authentication | |
| Authentication | |
| Number of LSAs | |
| LS age | Options | LS type = 10/11 |
| Opaque type = 1 | Opaque ID |
| Advertising Switch | |
| LS Sequence Number | |
| LS Checksum | Length = 120 |
| TLV type = TBD (eg16) (node internal info.) | Length = TBD |
| Sub-TLV type = 1 | Length = 1 |
| Conv. element = 32 | |
| Sub-TLV type = 3 | Length = 4 |
| Sub-TLV value = Local interface IP address | |
| Sub-TLV type = 4 | Length = 4 |
| Sub-TLV value = Remote interface IP address | |
| Sub-TLV type = 5 | Length = 4 |
| Sub-TLV value = Traffic engineering metric | |
| Sub-TLV type = 6 | Length = 4 |
| Sub-TLV value = Maximum bandwidth | |
| Sub-TLV type = 9 | Length = 4 |
| Sub-TLV value = Resource color | |
| Sub-TLV type = 8 | Length = 32 |
| Unreserved bandwidth at priority 0 | |
| Unreserved bandwidth at priority 1 | |
| Unreserved bandwidth at priority 2 | |
| Unreserved bandwidth at priority 3 | |
| Unreserved bandwidth at priority 4 | |
| Unreserved bandwidth at priority 5 | |
| Unreserved bandwidth at priority 6 | |
| Unreserved bandwidth at priority 7 | |
| Sub-TLV = 33 ((?)Sonet protection pair) | Length = 4 |
| Sub-TLV value = Protection group | |
| Sub-TLV = 14 | Length = 4 |
| Sub-TLV value = Protection type | |
| Sub-TLV = 32 ((?)conversion element type) | Length = 4 |
| Sub-TLV = Type of conversion element | |
| Sub-TLV = 16 | Length = 4 *n |
| Sub-TLV value = SRLG-1 | |
| Sub-TLV value = SRLG-2 | |
| ... | |
| ... | |
| Sub-TLV value = SRLG-n | |

In this example, the information about the conversion elements is disseminated by SPF protocols using the TLV structure shown above. As previously pointed out, existing standards such as OSPF-TE allow node-to-node connectivity (known as links) to be advertised among the nodes. In contrast, as before explained, the invention advertises or disseminates "node-internal" information such as this conversion element. The use of such information about the conversion elements results in better network utilization, as previously explained, and provides greater flexibility in routing network traffic.

In the illustrative TLV above, several new attributes are provided. Sub-TLVs 1,3,4,5,6, 9, 14, 16 represent the same attributes that they represent for today's links. The new features provided by the invention, however, are as follows:

TLV=16: This new TLV type 16 is for advertising "node internal" attributes.

A new value is defined for Sub-TLV=1, with Sub-TLV type=32 representing a conversion element.

Sub-TLV=32 is introduced: This type of conversion element specifies the kind of conversion element, such as optical-to electrical, electrical-to-optical, wavelength converter, Sonet-to-optical, optical-to-Sonet etc. Other types of conversion elements may also be defined.

Sub-TLV=33 is also introduced: For Sonet protection, only specific, pre-determined pairs of conversion elements will be capable of protecting each other. This Sub-TLV identifies the pair and a particular conversion element can only be protected by a conversion element that has the same protection pair value.

Of the above Sub-TLVs shown, Sub-TLV types 1 and 32 are mandatory (and can occur only once in a given TLV), as the two of them, together, specify what kind of conversion element is being advertised. All other Sub-TLVs are optional and are subject to the same rules as currently specified for link advertisements.

It is to be understood, however, that the illustrative numbers presented in the TLV chart above, will be subject to modification as the before mentioned IETF standards are evolved.

Preferred Types of Unified
ESF-OSF Nodes

In FIG. 9, a preferred combined optical data-electrical data switch fabric system of the invention is presented, using the unified structure of FIG. 2, and providing the novel results of more full utilization of the data flow capacity of optical paths for the optical switch fabric portion of the integrated node. By using information of the TLV system of the invention, assume that it has been determined that the optical path O is under-utilized in its data flow capability, and could well accommodate the insertion of additional data to flow along such path.

In accordance with the invention, the photonic data flow along the optical path O through the OSF portion of the integrated device, is diverted at $O^1$ and directed into the electrical switch fabric portion ESF where it is converted at the bridge card $B_I$ into electrical data packets. These are joined at J with other electrical data packets available along the data packet flow path E of the ESF, and the joined electrical packets are converted at $B_E$ to photonic data form and are sent at O" along the optical light path O, which is now fully utilized as a result of the supplemental insertion into the original phototonic data flow, of the added electrical switch fabric data packets.

Though the invention has thus far been described with reference to improved packing of optical path data flow, by adding data packets from the electrical switch fabric, the underlying technique of the invention is also useful where the supplemental data comes from other sources than an ESF—for example, from another photonic optical flow path B, as shown in FIG. 10. As described in connection with the diversion $O^1$ of the optical flow path O of FIG. 9, a second optical photonic data path, illustrated in FIG. 10 at $O_2$, is similarly diverted into the ESF at $O_2^1$ and also there converted into electrical packet data at $B_2$ and joined or added at $J^1$ to the electrical packet data converted from the diverted photonic data of optical path O (Flow A). Re-conversion to photonic data form at R enables the original photonic data of path O to be supplemented by photonic data from path $O_2$, more fully utilizing the available data flow capacity of the optical path O.

Clearly, multiple iterations of such filling of the "pipeline" of optical data flow paths may readily be carried out, more efficiently to communicate the data thereupon.

A Preferred Bridge Card/
Conversion Element Embodiment

It remains finally to describe appropriate circuit details of the bridge card/conversion elements previously discussed.

Figure 3:
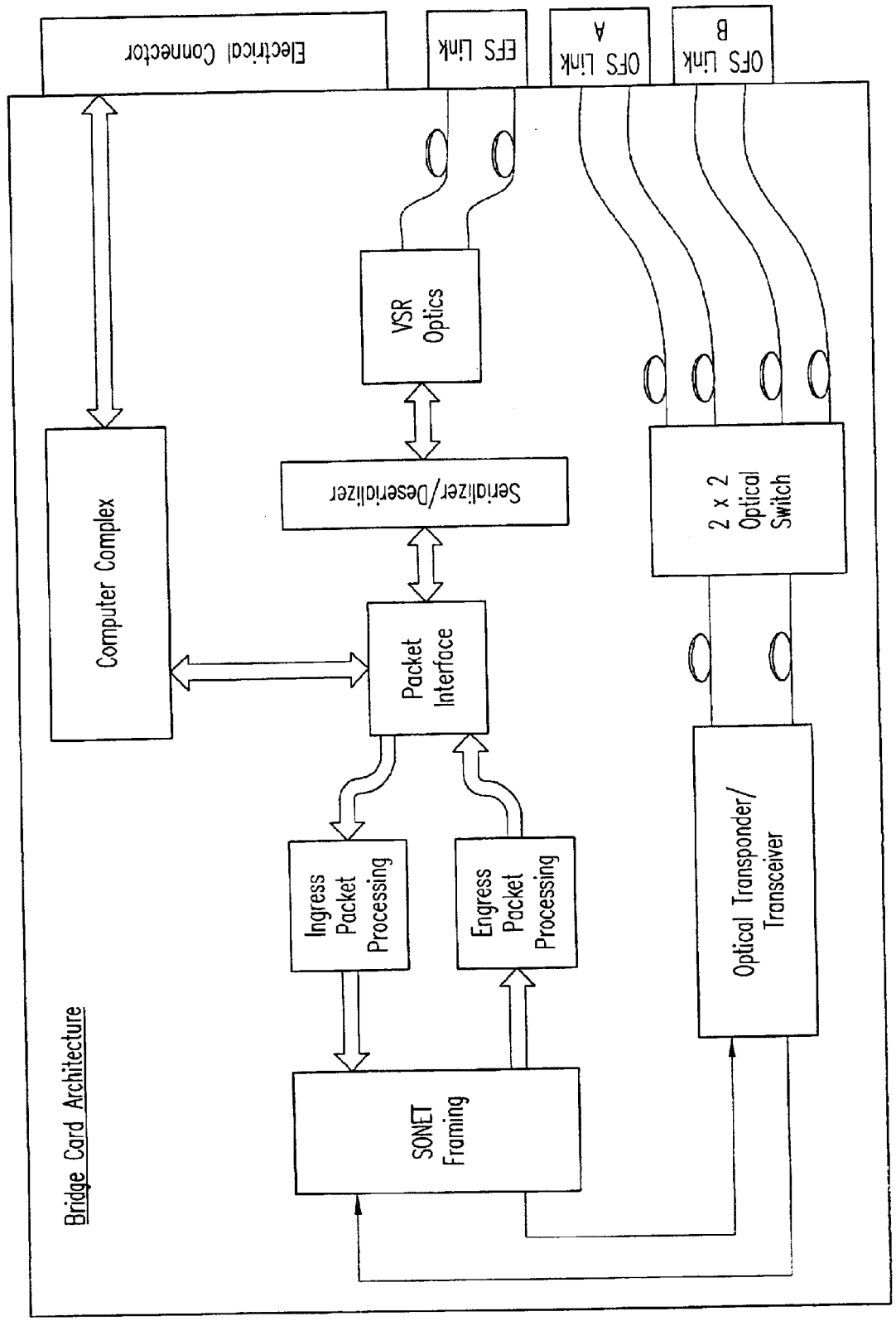
FIG. 3 is a block and schematic diagram of a preferred bridge card architecture for use in the system of FIG. 2.

A preferred bridge card architecture for use in the unified node of the invention is shown in the block diagram of FIG. 3, adapted exemplarily to define SONET capability. Other capabilities are, of course, also useful including, as another example, Gigabit Ethernet.

Otherwise the card architecture shows elements of both ESF and OSF components. The ESF-related components comprise the subsystem elements that process packets, such as in the ingress and egress packet processing blocks. These functions may include MPLS label lookup and label swapping functions as are well known. OSF related functions include the optical transponder as an example. The SONET framing capability is a function that fits into either domain.

The specific bridge card architecture functional blocks illustrated in FIG. 3 are mostly standard components utilized for this specific bridge card function. While described with reference to the electrical to optical path, the same set of functions is also applied in the reverse direction from the optical to the electrical path.

The incoming data from the ESF is shown received and transmitted using Very Short Reach (VRS) optical transceivers. This is implemented using a Vertical Cavity Surface Emitting Laser (VCSEL) transceiver array, so-labeled, which provides a low cost parallel laser array used for very short distances; in this case, transmission to and from the ESF. The data coming from the ESF is transformed from the optical domain to the electrical at that point. The Serdes (Serializer/Desearlizer) device so labeled, takes the electrical signal from the VCSEL transceivers and converts it to a wider, slower parallel interface for the next series of chips.

The Packet Interface performs two major functions. The first is to provide a FIFO mechanism to buffer data packets from and to the packet processing functions. The second is to provide a link protocol for the data traversing the VSR interface (both Tx and Rx). The link protocol, among other things, is responsible for creating the data packets from the associated bit stream and checking for any physical bit errors that may have occurred during transmission.

The Ingress and Egress packet processing provide the packet level services associated with this system. For example, classification based on MPLS header would occur in the Ingress packet processing. On the output side, there will be the addition of a new or modified MPLS header. These are standard packet processing functions that depend on the functionality of the device, as is well known. After such packet processing, the SONET framing occurs; the insertion or removal of packet data from a SONET frame. This device is specific to the particular SONET rate of the card. This could, for example, be an OC48 (2.5 G) device or OC192 (1 G) device or a Gigabit Ethernet. This function serves to add or remove appropriate layer-2 headers, as well as generate the SONET frame and associated indicators.

The optical transponder uses a Single Mode laser used to transmit data over longer distances. At this point, electrical to optical conversion of the data occurs. This is effectively the external or egress optical signal which is transmitted from the bridge card to the Optical Switch Fabric (OSF). The 2×2 Optical Switches are used to select one of two OSFs—two being used for redundancy (reliability and upgradability) purposes.

Finally, the compute complex of FIG. 3 is responsible for the management of the card. This software function, along with the rest of the software in the system forms the basis for the before-described common software control plane, connected to the main processing software through an electrical interface.

Further modifications will also occur to those skilled in this art. Other similar conversion functions can be visualized as well—for instance, wavelength converters present in the node can serve as another type of conversion element. While optical and packet data have been here described, the same conversion technique of the invention may also be applied for other combinations of communication networks, as well. Such and other variations, accordingly, are considered to fall within the spirit and scope of the invention as defined in the appended claims.

What is claimed is:

1. In a combined optical data-electrical data switch fabric system, a method of more fully utilizing the available data flow capacity of optical paths through the optical switch fabric, that comprises, flowing photonic data packets along a predetermined optical path in the optical switch fabric; flowing other data packets along a separate data flow path; determining when the predetermined optical path is under-utilized in its available data flow capability and the desirability of inserting in that predetermined optical path additional data from the separate data flow path; diverting the photonic data packet flow along said predetermined path into the electrical switch fabric and converting the same into electrical data packets; joining the converted electrical data packets with said other data packets also presented in electrical data packet form; converting the joined electrical data packets into photonic data packet flow; and sending the converted joined photonic data packets along said predetermined optical path of the optical switch fabric.

2. The method of claim 1 wherein said other data packets are electrical data packets inputted to the electrical switch fabric, and such are joined with the electrical data packets converted from the diverted photonic data of the optical switch fabric, with the joined electrical data packets converted into photonic data and applied to said predetermined optical path such that the predetermined path is additionally utilized by the supplement of the electrical switch fabric electrical data packets.

3. The method of claim 1 wherein said other data packets are photonic data packets from a further optical path in the optical switch fabric, and, after conversion to electrical data packets, are joined with the electrical data packets converted in the electrical switch fabric from the diverted photonic data of the predetermined optical path, with the joined packets then converted back to photonic data and applied to said predetermined optical path, such that the predetermined optical path is additionally utilized by the supplement of data of the further optical path.

4. The method of claim 2 wherein the converting steps allow data packet processing capability to be present for the switch fabrics such as to allow for the processing of data traffic at the data packet level or as an optical wavelength.

5. The method of claim 2 wherein the electrical switch fabric and optical switch fabric are operated with a common software control plane as an integrated node processing both packet and optical connections.

6. The method of claim 5 wherein said software enables data traffic to be diverted from the optical domain into the electrical domain, combined with supplemental data traffic in the electrical domain, and then inserted back into the optical domain with the shortest path flow.

7. The method of claim 2 wherein, through the converting steps, a wavelength capable interfacing can be connected to the electrical switch fabric and serve as a packet-capable interfacing.

8. The method of claim 7 wherein such wavelength capable interfacing is connected or disconnected to or from the electrical switch fabric by controlling the switching of the optical switch fabric.

9. The method of claim 8 wherein such wavelength capable interfacing provide flexibility to changing data traffic demands and better utilization of optical data flow resources.

10. The method of claim 2 wherein the connecting steps also involve employing embedded routing intelligence for routing the packet traffic.

11. The method of claim 10 wherein a converting step takes data encoded in a wavelength and outputs a packet in the electrical domain while determining where the packet is next to be sent.

12. The method of claim 11 wherein a TLV type message is used to disseminate to other nodes information about said converting.

13. The method of claim 12 wherein an optical node is informed as to what kind of traffic is being transported over the optical connections.

14. The method of claim 2 wherein the combined system, through the use of said converting steps, can be configured as a node with N electrical links, M optical links and C converting elements, as well as a node with N+C electrical links and M−C optical links.

15. The method of claim 10 wherein said intelligence is provided to the optical node, allowing it to adapt its configuration to suit the needs of the packet traffic data carried along its optical paths.

16. A combined optical data-electrical data switch fabric system, for more fully utilizing the available data flow capacity of optical paths through the optical switch fabric, having, in combination, an ingress for flowing photonic data packets along a predetermined optical path in the optical switch fabric; an ingress for flowing other data packets along a separate data flow path; means for determining when the predetermined optical path is under-utilized in its available data flow capability and the desirability of inserting in that predetermined optical path additional data from the separate data flow path; means for diverting the photonic data packet flow along said predetermined path into the electrical switch fabric and converting the same into electrical data packets; means for joining the converted electrical data packets with said other data packets also presented in electrical data packet form; means for converting the joined electrical data packets into photonic data packet flow; and means for sending the converted joined photonic data packets along said predetermined optical path of the optical switch fabric.

17. The system of claim 16 wherein said other data packets are electrical data packets inputted along the first-named ingress to the electrical switch fabric, and such are joined with the electrical data packets converted from the diverted photonic data of the optical switch fabric, with the joined electrical data packets converted by said converting means into photonic data and applied to said predetermined optical path such that the predetermined path is additionally utilized by the supplement of the electrical switch fabric electrical data packets.

18. The system of claim 16 wherein said other data packets are photonic data packets from a further optical path in the optical switch fabric, and, after conversion to electrical data packets, are joined with the electrical data packets converted in the electrical switch fabric from the diverted photonic data of the predetermined optical path, with the joined packets then converted by said converting means back to photonic data and applied to said predetermined optical path, such that the predetermined optical path is additionally utilized by the supplement of data of the further optical path.

19. The system of claim 17 wherein there is further provided data packet processing means for the switch fabrics such as to allow for the processing of data traffic at the data packet level or as an optical wavelength.

20. The system of claim 17 wherein there is further provided for the electrical switch fabric and optical switch fabric operation, a common software control plane serving as an integrated node processing both packet and optical connections.

21. The system of claim 20 wherein said software enables data traffic to be diverted from the optical domain into the electrical domain, combined by said joining means with supplemental data traffic in the electrical domain, and then inserted back into the optical domain with the shortest path flow.

22. The system of claim 17 wherein, through the converting means, a wavelength capable interfacing can be connected to the electrical switch fabric and serve as a packet-capable interfacing.

23. The system of claim 22 wherein such wavelength capable interfacing is connected or disconnected to or from the electrical switch fabric by means for controlling the switching of the optical switch fabric.

24. The system of claim 23 wherein there is provided such wavelength capable interfacing for enabling flexibility in changing data traffic demands and better utilization of optical data flow resources.

25. The system of claim 17 wherein means is provided for employing embedded routing intelligence for routing the packet traffic.

26. The system of claim 25 wherein means is provided for taking data encoded in a wavelength and outputting a packet converted to the electrical domain while determining where the packet is next to be sent.

27. The system of claim 26 wherein a TLV type messenger is used to disseminate to other nodes information about the converting.

28. The system of claim 27 wherein means is provided for informing an optical node as to what kind of traffic is being transported over the optical connections.

29. The system of claim 17 wherein the combined system, through the use of said converting means, can be configured as a node with N electrical links, M optical links and C converting elements, as well as a node with N+C electrical links and M−C optical links.

30. The system of claim 25 wherein there is means for providing said intelligence to the optical node, allowing it to adapt its configuration to suit the needs of the packet traffic data carried along its optical paths.

* * * * *